(12) United States Patent
Wada

(10) Patent No.: US 8,287,139 B2
(45) Date of Patent: Oct. 16, 2012

(54) LIGHT SOURCE DEVICE AND PROJECTOR

(75) Inventor: Susumu Wada, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 289 days.

(21) Appl. No.: 12/706,765

(22) Filed: Feb. 17, 2010

(65) Prior Publication Data

US 2010/0208215 A1 Aug. 19, 2010

(30) Foreign Application Priority Data

Feb. 18, 2009 (JP) ................................ 2009-034909

(51) Int. Cl.
*G03B 21/28* (2006.01)

(52) U.S. Cl. ................ 353/99; 353/31; 353/34; 353/37; 353/97; 353/102; 353/119; 353/122; 362/297; 362/298

(58) Field of Classification Search .................... 353/31, 353/34, 37, 3, 97, 99, 102, 119, 122; 313/110–113, 313/46, 313; 362/297, 298, 346, 294, 345, 362/255, 256

See application file for complete search history.

(56) References Cited

U.S. PATENT DOCUMENTS

| | | | |
|---|---|---|---|
| 7,150,535 B2 * | 12/2006 | Akiyama | 353/38 |
| 7,178,960 B2 * | 2/2007 | Ishida | 362/545 |
| 7,213,944 B2 * | 5/2007 | Shimaoka et al. | 362/299 |
| 7,377,670 B2 * | 5/2008 | Takezawa | 362/264 |
| 7,390,116 B2 * | 6/2008 | Jain | 362/551 |
| 7,397,189 B2 * | 7/2008 | Kobayashi et al. | 313/601 |
| 2005/0046809 A1 * | 3/2005 | Way | 353/99 |
| 2005/0140933 A1 * | 6/2005 | Cannon et al. | 353/37 |
| 2006/0198139 A1 * | 9/2006 | Cheng | 362/241 |
| 2006/0203497 A1 * | 9/2006 | Shimaoka et al. | 362/346 |
| 2007/0013281 A1 * | 1/2007 | Miyasu et al. | 313/24 |
| 2007/0182301 A1 * | 8/2007 | Yamauchi et al. | 313/113 |
| 2007/0200473 A1 * | 8/2007 | Kyomoto et al. | 313/114 |
| 2008/0079343 A1 * | 4/2008 | Kirsten et al. | 313/111 |
| 2008/0094460 A1 * | 4/2008 | Nakata et al. | 347/102 |

FOREIGN PATENT DOCUMENTS

| | | |
|---|---|---|
| JP | A-2008-226570 | 9/2008 |
| JP | A-2009-176456 | 8/2009 |

\* cited by examiner

*Primary Examiner* — Georgia Y Epps
*Assistant Examiner* — Sultan Chowdhury
(74) *Attorney, Agent, or Firm* — Oliff & Berridge, PLC

(57) ABSTRACT

A light source device, includes: an arc tube, and a pair of sealing portions; a reflector; and a sub mirror configured to reflect the light emitted from the arc tube toward the arc tube, and disposed of the other side of the sealing portion in such a manner as to cover a part of the outer surface of the tube spherical portion of the side of the illumination area, the sub mirror include a plurality of reflection members provided with reflection surfaces having different shapes, and the distance between the illumination axis and the outer shape of one of the adjoining reflection members is different from the distance between the illumination axis and the other of the adjoining reflection members.

10 Claims, 6 Drawing Sheets

LIGHT SOURCE DEVICE AND PROJECTOR

BACKGROUND

1. Technical Field

The present invention relates to a light source device and a projector including the light source device.

2. Related Art

As disclosed in JP-A-2008-226570, a light source device which includes a sub mirror in an arc tube to use light emitted from the arc tube with high efficiency is known. This sub mirror is fixed to the arc tube by an adhesive.

According to the light source device having the sub mirror fixed to the arc tube, air for cooling a tube spherical portion (cooling air) is difficult to be supplied between the arc tube (particularly the tube spherical portion) and the sub mirror. Thus, when cooling (air supply) is provided by using a cooling fan, the temperature of the tube spherical portion is difficult to be properly controlled by the air supply. Moreover, the temperature difference between the upper area of the tube spherical portion (particularly the highest portion of the upper side) and the lower area (particularly the lowest portion of the lower side) increases.

When air is supplied to adjust the temperature of the upper area of the tube spherical portion to an appropriate temperature with the increased temperature difference between the upper area and the lower area of the tube spherical portion, the temperature of the lower area of the tube spherical portion is excessively lowered. In this case, the lower area of the tube spherical portion may be blackened. On the contrary, when air is supplied to adjust the temperature of the lower area of the tube spherical portion to an appropriate temperature, the temperature of the upper area of the tube spherical portion is excessively raised. In this case, the upper area of the tube spherical portion may be whitened. When these phenomena are produced, the areas of the tube spherical portion corresponding to the phenomena lose transparency. Thus, both blackening and whitening are considered to be factors that decrease the light amount of the arc tube.

The whitening herein refers to a phenomenon which whitens a base material constituting the tube spherical portion at the time of recrystallization caused by the high temperature. The blackening refers to a phenomenon where evaporated atoms of a base material constituting an electrode (such as tungsten atoms) do not return to the electrode but adhere to the inner wall of the tube spherical portion when a halogen cycle of the base material is not performed due to the low temperature. When the whitening or blackening develops, the area corresponding to the whitening or blackening absorbs heat and breaks the tube spherical portion in some cases.

Therefore, such a light source device and a projector have been demanded which can efficiently cool the tube spherical portion even when the sub mirror is provided, and can decrease the temperature difference between the upper area and the lower area of the tube spherical portion.

SUMMARY

It is an advantage of some aspects of the invention to provide a light source device and a projector including the light source which can solve at least a part of the above problems.

First Aspect

A first aspect of the invention is directed to a light source device which includes: an arc tube includes a tube spherical portion containing a pair of electrodes disposed along an illumination axis, and a pair of sealing portions extending from both sides of the tube spherical portion; a reflector disposed in the vicinity of one of the sealing portions of the arc tube to reflect light emitted from the arc tube toward an illumination area; and a sub mirror configured to reflect the light emitted from the arc tube toward the arc tube. The sub mirror disposed of the other sealing portion in such a manner as to cover a part of the outer surface of the tube spherical portion of the side of the illumination area, the sub mirror include a plurality of reflection members provided with reflection surfaces having different shapes. The distance between the illumination axis and the outer shape of one of the adjoining reflection members is different from the distance between the illumination axis and the other of the adjoining reflection members.

According to the light source device of this aspect, the sub mirror includes the plural reflection members having different shapes of the reflection surfaces and disposed at different positions unlike a related-art sub mirror constituted by one unit and having one reflection surface shape. Thus, a clearance is produced between each adjoining pair of the reflection members, which improves breathability of the sub mirror. In this structure, cooling air introduced through the clearances can efficiently cool the arc tube. Moreover, the temperature difference between the upper area and the lower area of the tube spherical portion of the arc tube can be reduced at the time of cooling the arc tube by disposing the reflection members at different positions, for example.

Second Aspect

A second aspect of the invention is directed to the light source device according to the above aspect, wherein the distance between the illumination axis and the reflection surface of the reflection member included in the plural reflection members disposed opposed to the upper area of the tube spherical portion is longer than the distance between the illumination axis and the reflection surface of the reflection member disposed opposed to the lower area of the tube spherical portion.

According to the light source device of this aspect, the distance between the illumination axis and the reflection member disposed opposed to the upper area of the tube spherical portion is longer than the distance between the illumination axis and the reflection member disposed opposed to the lower are of the tube spherical portion. In this case, the cooling air can easily flow to the area above the tube spherical portion and cannot easily flow to the area below the tube spherical portion. Thus, the temperature difference between the upper area and the lower area of the tube spherical portion of the arc tube can be further reduced. The upper direction and the lower direction of the arc tube and the tube spherical portion herein correspond to the upper direction and the lower direction with respect to the direction of gravity in the environment where the arc tube and the tube spherical portion are to be installed.

Third Aspect

A third aspect of the invention is directed to the light source device according to the above aspects, wherein: the distance between the illumination axis and the reflection surface of the reflection member positioned opposed to the upper area of the tube spherical portion is the maximum; the distance between the illumination axis and the reflection surface of the reflection member gradually decreases as the position of the reflection member shifts toward the lower area of the tube spherical portion; and the distance between the illumination axis and the reflection surface of the reflection member disposed opposed to the lower area of the tube spherical portion is the minimum.

According to the light source device of this aspect, the distance between the illumination axis and the reflection surface of the reflection member positioned above the tube spherical portion is the maximum. The distance between the illumination axis and the reflection surface of the reflection member gradually decreases as the position of the reflection member shifts toward the lower area of the tube spherical portion. The distance between the illumination axis and the reflection surface of the reflection member disposed below the tube spherical portion is the minimum. Thus, the temperature difference between the upper area and the lower area of the tube spherical portion of the arc tube can be further reduced at the time of cooling. In addition, temperature change from the upper area to the lower area of the tube spherical portion can be properly reduced.

Fourth Aspect

A fourth aspect of the invention is directed to a projector which includes the light source device described above, and an optical modulation device which modulates light emitted from the light source device to form an optical image according to image signals.

The projector according to this aspect of the invention includes the light source device described above which can reduce the temperature difference between the upper area and the lower area of the tube spherical portion. Thus, the life of the light source included in the projector can be increased.

Fifth Aspect

A fifth aspect of the invention is directed to the projector according to the above aspect further includes a cooling fan which cools the light source device. In this case, cooling air generated by the cooling fan is delivered in a direction substantially perpendicular to the illumination axis and in the substantially horizontal direction of the sub mirror.

According to the projector of this aspect of the invention, the cooling air generated by the cooling fan is supplied in the direction substantially perpendicular to the illumination axis and in the substantially horizontal direction of the sub mirror. In this case, the cooling air can be easily introduced into the sub mirror through the clearances, and the temperature difference between the upper area and the lower area of the tube spherical portion can be further efficiently reduced at the time of cooling. Thus, the life of the light source included in the projector can be further increased.

BRIEF DESCRIPTION OF THE DRAWINGS

The invention will be described with reference to the accompanying drawings, wherein like numbers reference like elements.

FIGS. 3A and 3B are perspective views illustrating reflection members included in a sub mirror, wherein: FIG. 3A is a perspective view showing a first reflection member of the sub mirror; and FIG. 3B is a perspective view showing a second reflection member of the sub mirror.

DESCRIPTION OF EXEMPLARY EMBODIMENTS

Exemplary embodiments according to the invention are hereinafter described with reference to the drawings.

First Embodiment

Figure 1:
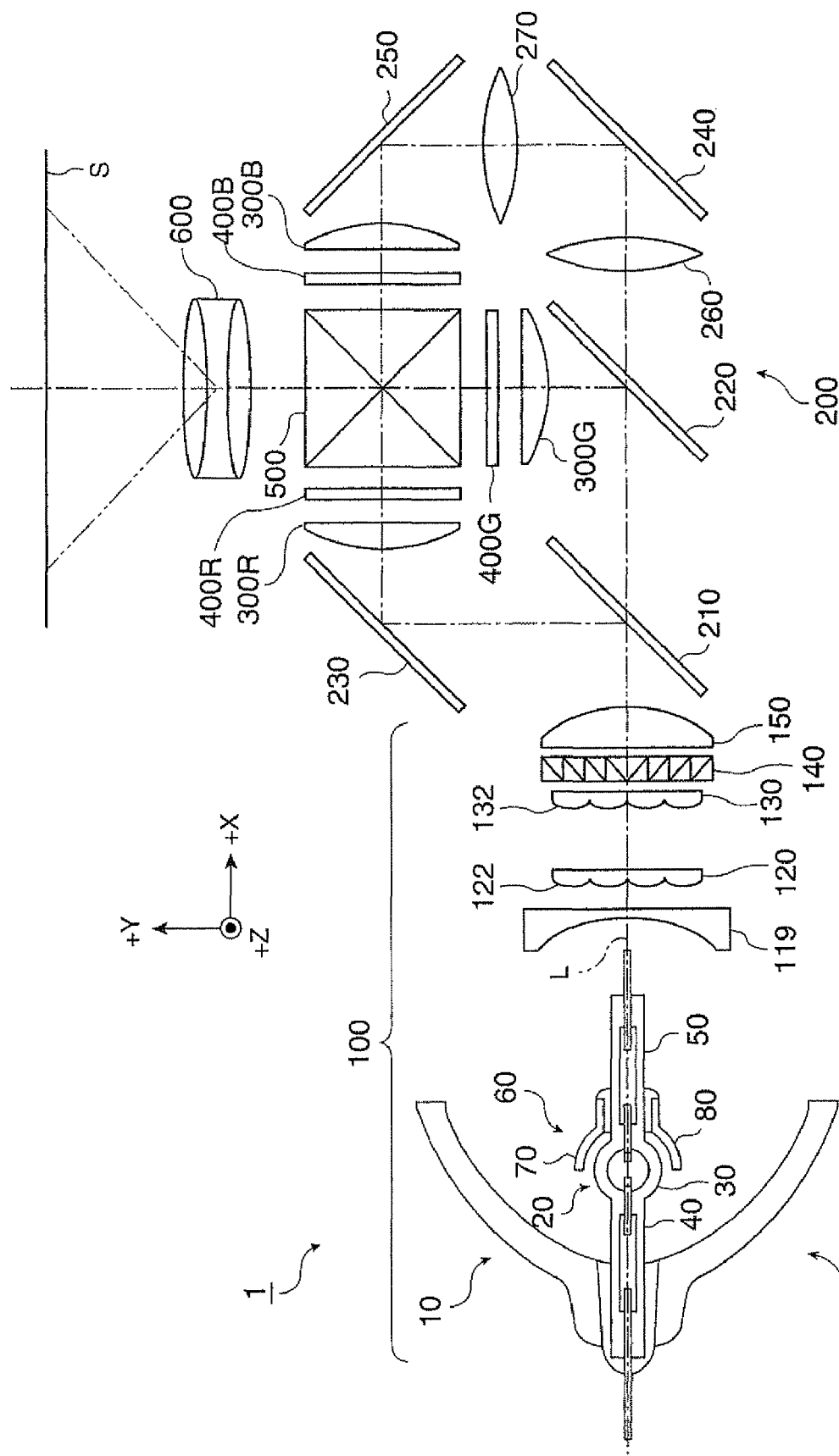
FIG. 1 illustrates optical systems of a projector according to a first embodiment.
Figure 2:
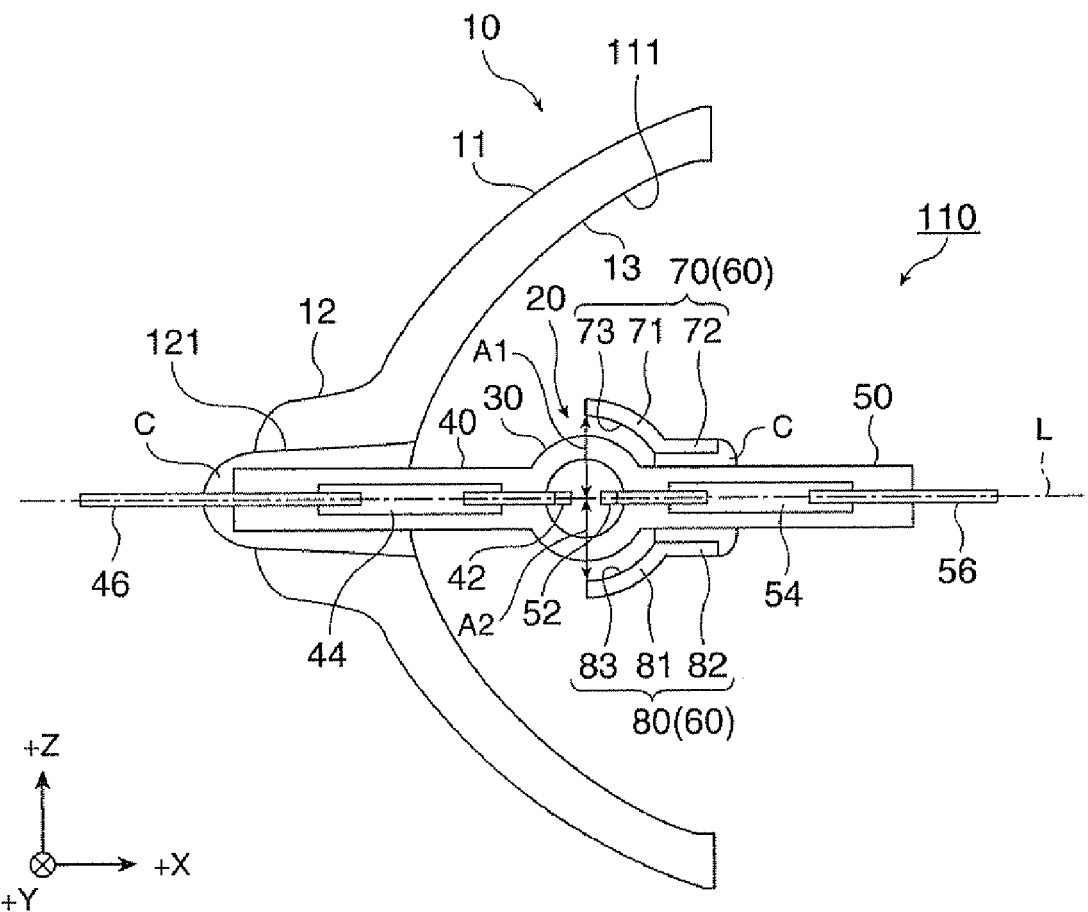
FIG. 2 is a cross-sectional view of a light source device.

FIG. 1 illustrates optical systems of a projector according to a first embodiment. FIG. 2 is a cross-sectional view of a light source device.

The structure and operation of optical systems included in a projector 1 are explained with reference to FIGS. 1 and 2.

The figures describing this embodiment (FIGS. 1 and 2, and FIGS. 3A through 5 described later) show an XYZ orthogonal coordinate system indicating an X axis direction as a direction of an illumination axis L of light emitted from a light source device 110 toward an illumination area, a Y axis direction as a direction orthogonal to the X axis direction and parallel with the sheet surface of FIG. 1, and a Z axis direction as a direction orthogonal to the X axis direction and perpendicular to the sheet surface of FIG. 1. The +X direction corresponds to the light traveling direction. The +Y direction corresponds to the left direction with respect to the +X direction. The +Z direction corresponds to the upper direction with respect to the +X direction.

The projector 1 according to this embodiment has optical systems. The optical systems form an optical image by modulating light emitted from the light source device 110 according to image signals, and project the optical image to a projection target surface such as a screen S through a projection system 600 to form a projection image.

As illustrated in FIG. 1, the optical systems of the projector 1 include an integrator illumination system 100, a color separation and light guide system 200, an optical modulation device, a color combining system, and the projection system 600. The integrator illumination system 100 is an optical system for equalizing illuminance of light emitted from the light source device 110 within a plane orthogonal to the illumination axis L. The color separation and light guide system 200 separates illumination light received from the integrator illumination system 100 into three color lights in red (R), green (G), and blue (B), and guides the divided color lights to the illumination area.

The optical modulation device is an optical system which modulates each of the three color lights separated by the color separation and light guide system 200 according to image signals, and includes three liquid crystal devices 400R, 400G, and 400B corresponding to the three color lights in red (R), green (G), and blue (B). The color combining system is an optical system which combines optical images modulated by the optical modulation device (the three liquid crystal devices 400R, 400G, and 400B), and includes a cross dichroic prism 500. The projection system 600 is an optical system which projects an optical image produced by combining the optical images in the respective colors using the color combining system (the cross dichroic prism 500) to the projection target surface such as the screen S.

The integrator illumination system 100 includes the light source device 110 for emitting illumination light toward the illumination area, a concave lens 119 for releasing the converged light emitted from the light source device 110 as substantially parallel light, and a first lens array 120 having a plurality of first small lenses 122 for dividing the illumination light released from the concave lens 119 into a plurality of partial lights. The integrator illumination system 100 further includes a second lens array 130 having a plurality of second small lenses 132 corresponding to the plural first small lenses 122 of the first lens array 120, a polarization converting element 140 which converts the partial lights released from the second lens array 130 into substantially one type of linear polarized lights having the same polarization direction and releases the converted lights, and a stacking lens 150 for stacking the respective partial lights released from the polarization converting element 140 on the illumination area.

As illustrated in FIGS. 1 and 2, the light source device 110 includes a reflector 10, an arc tube 20 having the light emission center in the vicinity of a first focus of the reflector 10, and a sub mirror 60 having a plurality of reflection members (first reflection members 70 and second reflection members 80 in this embodiment) for reflecting light emitted from a tube spherical portion 30. The light source device 110 emits light having the illumination axis L as the center axis.

The details of the structure and operation of the light source device 110 will be described after the explanation of the optical systems of the projector 1.

As illustrated in FIG. 1, the concave lens 119 is disposed on the illumination area of the reflector 10. The concave lens 119 is so designed as to emit the light from the reflector 10 toward the first lens array 120.

The first lens array 120 functions as a light dividing optical element for dividing light from the concave lens 119 into plural partial lights, and has the plural first small lenses 122 disposed in matrix having plural lines and plural rows within a plane orthogonal to the illumination axis L. Each external shape of the first small lenses 122 is similar to each external shape of the image forming areas of the liquid crystal devices 400R, 400G, and 400B.

The second lens array 130 forms respective images of the first small lenses 122 of the first lens array 120 in the vicinity of the image forming areas of the liquid crystal devices 400R, 400G, and 400B in cooperation with the stacking lens 150. The second lens array 130 has structure substantially similar to that of the first lens array 120, containing the plural second small lenses 132 disposed in matrix having plural lines and plural rows within a plane orthogonal to the illumination axis L.

The polarization converting element 140 is a polarizing element which converts the respective partial lights divided by the first lens array 120 into substantially one type of linear polarized lights having the same polarization direction and emits the converted lights. The polarization converting element 140 has a polarization dividing layer which transmits one of the linear polarized light components of the polarized light components contained in the light emitted from the light source device 110 and reflects the other linear polarized light component in a direction perpendicular to the illumination axis L, a reflection layer which reflects the other linear polarized light component reflected by the polarization dividing layer in a direction parallel with the illumination axis L, and a retardation film which converts the one linear polarized light component transmitted by the polarization dividing layer into the other linear polarized light component.

The stacking lens 150 is an optical element which collects the plural partial lights having passed the first lens array 120, the second lens array 130, and the polarization converting element 140 and stacks the collected partial lights in the vicinity of the image forming areas of the liquid crystal devices 400R, 400G, and 400B. The stacking lens 150 is disposed in such a position that the optical axis of the stacking lens 150 almost coincides with the illumination axis L of the integrator illumination system 100. The stacking lens 150 may be a compound lens produced by combining plural lenses.

The color separation and light guide system 200 has dichroic mirrors 210 and 220, reflection mirrors 230, 240, and 250, an entrance side lens 260, and a relay lens 270. The color separation and light guide system 200 separates the illumination light emitted from the stacking lens 150 into three color lights of red light, green light, and blue light, and guides the respective color lights to the three liquid crystal devices 400R, 400G, and 400B as the illumination targets.

The liquid crystal devices 400R, 400G, and 400B which modulate illumination light according to image signals are the illumination targets of the integrator illumination system 100. Each of the liquid crystal devices 400R, 400G, and 400B has liquid crystals as electro-optic substances sealed between a pair of transparent glass base materials, and modulates the polarization direction of the one type of the linear polarized light emitted from an entrance side polarization plate described later according to inputted image signals by using polysilicon TFT as switching elements, for example.

Converging lenses 300R, 300G, and 300E are disposed on the optical path before the liquid crystal devices 400R, 400G, and 400B. Though not shown in the figure, the entrance side polarization plates are interposed between the converging lens 300R and the liquid crystal device 400R between the converging lens 300G and the liquid crystal device 400G, and between the converging lens 300B and the liquid crystal device 400B, and exit side polarization plates are interposed between the liquid crystal device 400R and the cross dichroic prism 500, between the liquid crystal device 400G and the cross dichroic prism 500, and between the liquid crystal device 400B and the cross dichroic prism 500. The respective entering color lights are modulated by the entrance side polarization plates, the liquid crystal devices 400R, 400G, and 400B, and the exit side polarization plates.

The cross dichroic prism 500 is an optical device which combines the color lights emitted from the exit side polarization plates and modulated for each color light to form a color image. The cross dichroic prism 500 has a substantially square shape in the plan view produced by affixing four rectangular prisms, and dielectric multilayer films are provided on the interfaces of the rectangular prisms affixed to one another in an approximately X shape. The dielectric multilayer film formed on one of the interfaces in the substantially X shape reflects the red light, and the dielectric multilayer film formed on the other interface reflects the blue light. The red light and the blue light are bended by the dielectric multilayer films in the same direction as the traveling direction of the green light such that the three color lights can be combined.

The color image emitted from the cross dichroic prism 500 is expanded and projected by the projection system 600 to form a projection image on the screen S as the projection target surface.

The projector 1 further includes a cooling mechanism (not shown). The cooling mechanism has a cooling fan (not shown) for cooling at least the light source device 110, and a cooling flow path (not shown) through which cooling air generated by the cooling fan flows. The cooling mechanism may be so designed as to cool other optical system elements (such as the liquid crystal devices 400R, 400G, and 400B) as well as the light source device 110.

Figure 3A:
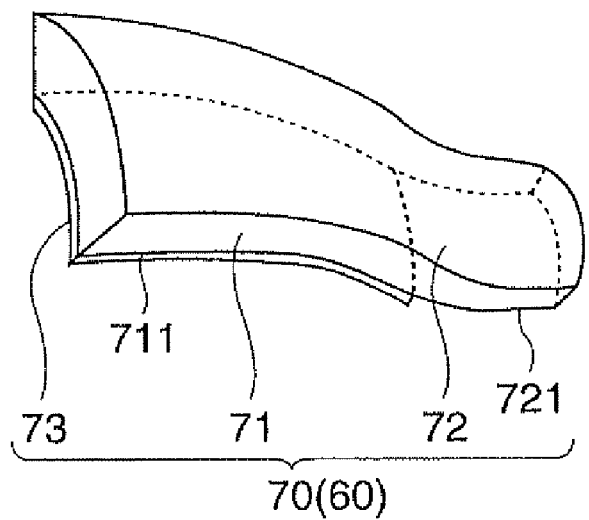
Figure 3B:
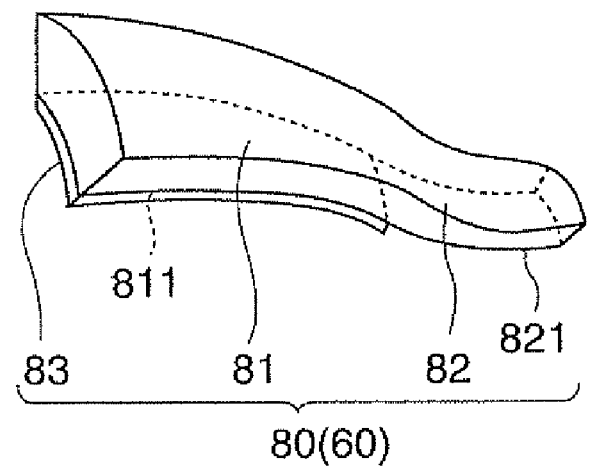
Figure 4:
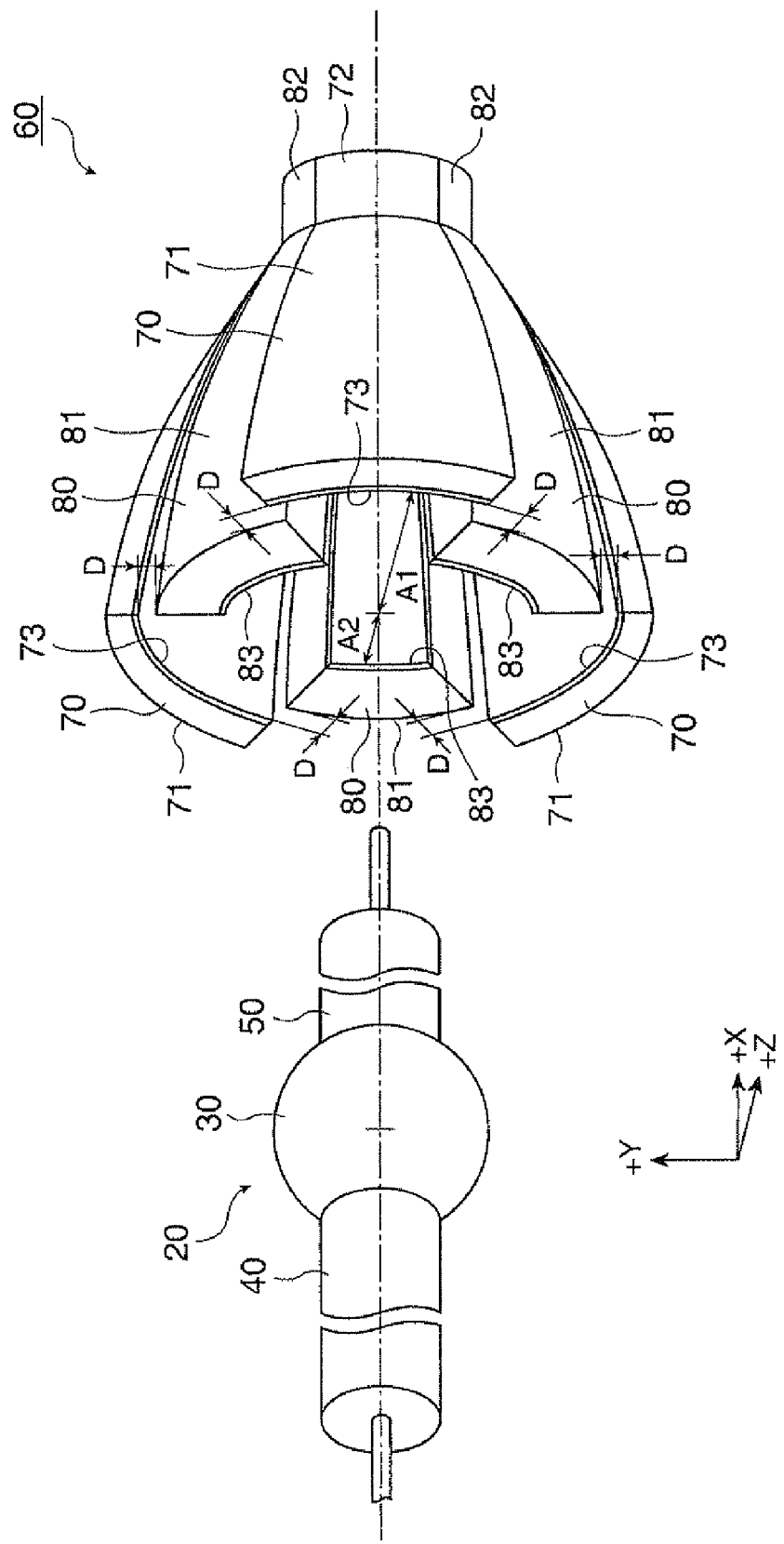
FIG. 4 is a perspective view illustrating the sub mirror which includes the joined reflection members.
Figure 5:
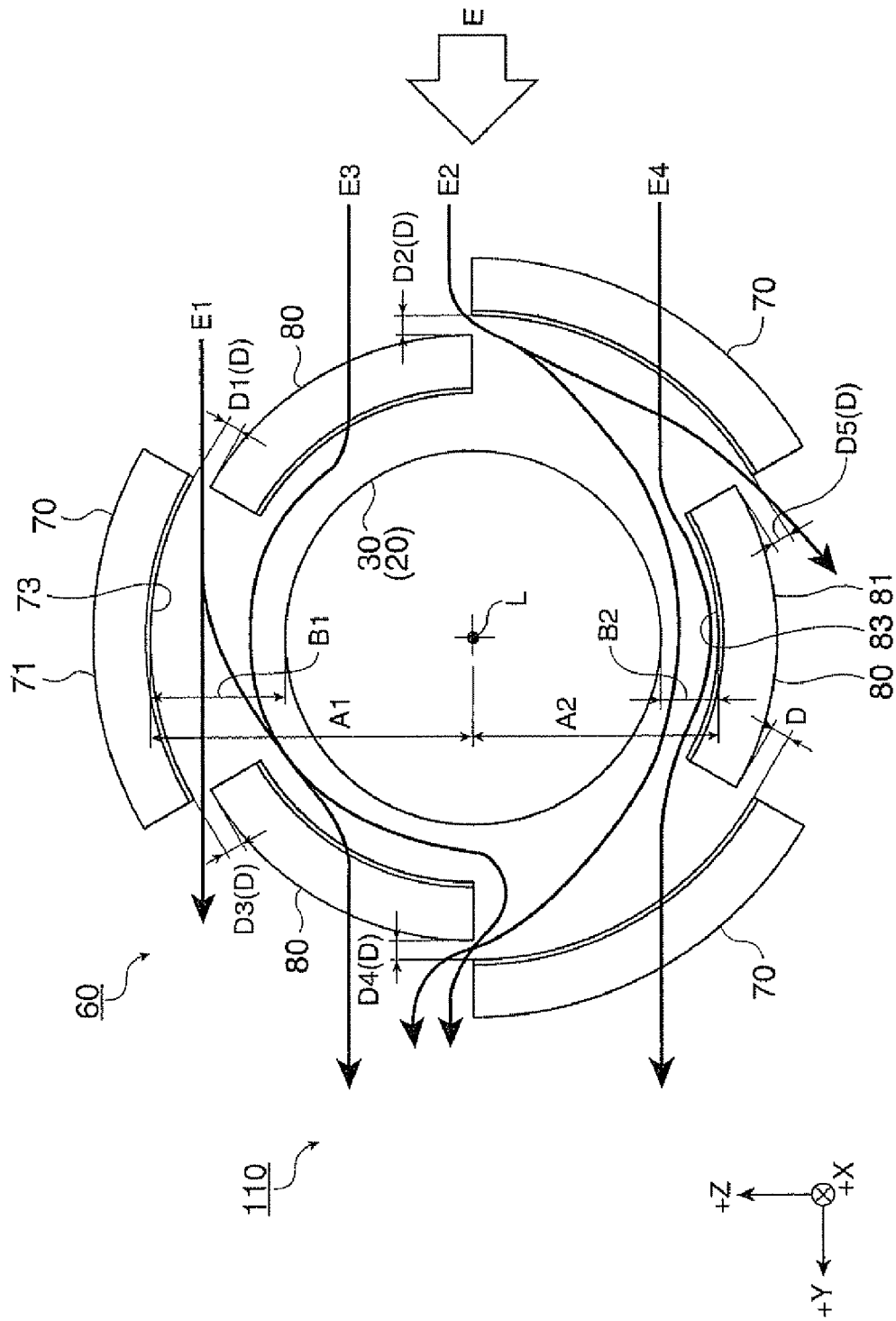
FIG. 5 is a cross-sectional view schematically illustrating a tube spherical portion and the sub mirror cut at the center of the tube spherical portion along a flat plane perpendicular to an illumination axis.

FIGS. 3A and 3B are perspective views illustrating the reflection members included in the sub mirror. FIG. 3A is a perspective view showing the first reflection member of the sub mirror, and FIG. 3B is a perspective view showing the second reflection member of the sub mirror. FIG. 4 is a perspective view illustrating the sub mirror including the reflection members joined to each other. FIG. 4 also shows how the reflection members shown in FIGS. 3A and 3B are assembled as the sub mirror and incorporated in the arc tube. FIG. 5 is a cross-sectional view schematically illustrating the tube spherical portion and the sub mirror cut at the center of the tube spherical portion along a flat plane perpendicular to the illumination axis.

The structure and operation of the light source device 110 are now explained with reference to FIG. 3A through FIG. 5 (and FIGS. 1 and 2 if necessary).

As illustrated in FIGS. 1 and 2, the light source device 110 includes the reflector 10, the arc tube 20 having the light emission center in the vicinity of the first focus of the reflector 10, and the sub mirror having the plural reflection members (the first reflection members 70 and the second reflection members 80 in this embodiment) for reflecting light emitted from the tube spherical portion 30. The light source device 110 emits light having the illumination axis L as the center axis.

As illustrated in FIG. 2, the reflector 10 includes a reflector main body 11 having an ellipsoidal concave surface 111, and a cylindrical portion 12 through which an end of a sealing portion (one of sealing portions) 40 of the arc tube 20 described later is inserted to be fixed to the cylindrical portion 12. The reflector main body 11 and the cylindrical portion 12 constituting the reflector 10 are formed integrally with each other. A reflection layer 13 having high reflectance is provided on the concave surface 111 of the reflector main body 11.

The cylindrical portion 12 is a cylindrical body provided on the surface opposite to the reflection layer 13 in such a manner as to extend from the centers of the reflection layer 13 and the reflector main body 11. An opening 121 is formed inside the cylindrical portion 12 such that the end of the sealing portion 40 of the arc tube 20 described later can be inserted through the opening 121 and fixed thereto. The arc tube 20 described later is fixed to the cylindrical portion 12 of the reflector 10 by inserting the end of the sealing portion through the opening 121 and filling the clearance between the opening 121 and the sealing portion 40 with an inorganic adhesive C such as cement.

Preferable examples of the base material for constituting the reflector 10 (the reflector main body 11 and the cylindrical portion 12) are crystallized glass and alumina ($Al_2O_3$). The reflection layer 13 is formed by a dielectric multilayer film made of titanium oxide ($TiO_2$) and silicon oxide ($SiO_2$) for example.

As illustrated in FIG. 2, the arc tube 20 includes the tube spherical portion 30 having a spherical shape, and a pair of the sealing portions 40 and 50 extending from both sides of the tube spherical portion 30. The arc tube 20 has a pair of electrodes 42 and 52 contained in the tube spherical portion 30 and disposed close to and opposed to each other along the illumination axis L, a pair of metal foils 44 and 54 sealed within the pair of the sealing portions 40 and 50, respectively, and a pair of leads 46 and 56 electrically connected with a pair of the metal foils 44 and 54.

The conditions and the like of the elements included in the arc tube 20 are as follows, for example. The tube spherical portion 30 and the sealing portions 40 and 50 are made of quartz glass or the like, and mercury, rare gas, and a small amount of metal halogenated material are sealed into the tube spherical portion 30. The electrodes 42 and 52 are tungsten electrodes or the like, and the metal foils 44 and 54 are molybdenum foils or the like. The leads 46 and 56 are made of molybdenum or tungsten, for example. The arc tube 20 can be formed by various types of arc tube capable of emitting light having high luminance, such as high-pressure mercury lamp, extra-high pressure mercury lamp, and metal halide lamp.

As illustrated in FIGS. 2, 4, and 5, the sub mirror 60 is a component for covering substantially a half of the tube spherical portion 30. The sub mirror 60 is disposed opposed to the concave surface 111 of the reflector 10 to reflect light emitted from the tube spherical portion 30 toward the tube spherical portion 30. The sub mirror 60 has the plural reflection members having different reflection surface shapes. According to this embodiment, the sub mirror 60 has two types of reflection members, i.e., the first reflection member 70 and the second reflection member 80 having reflection layers 73 and 83 in different shapes as illustrated in FIGS. 3A and 3B. As can be seen from FIG. 4, the sub mirror 60 has the three first reflection members 70 and the three second reflection members 80. The one unit of the sub mirror 60 is produced by assembling the first reflection members 70 and the second reflection members 80 such that the sides of cylindrical portions 72 and 82 (described later) of the first and second reflection members 70 and 80 are alternately disposed in contact with one another.

As illustrated in FIG. 3A, each of the first reflection members 70 includes a reflection member main body 71 having a concave surface 711, and a cylindrical portion 72 having a fixing opening 721 through which the sealing portion (the other sealing portion) 50 of the arc tube 20 is inserted to be fixed to the fixing opening 721 when assembled into the sub mirror 60. The reflection layer 73 as a reflection surface having high reflectance is provided on the concave surface 711 of the reflection member main body 71.

As illustrated in FIG. 3B, each of the second reflection members 80 includes a reflection member main body 81 having a concave surface 811, and a cylindrical portion 82 having a fixing opening 821 through which the sealing portion (the other sealing portion) 50 of the arc tube 20 is inserted to be fixed to the fixing opening 821 when assembled into the sub mirror 60 similarly to the first reflection member 70. The reflection layer 83 as a reflection surface having high reflectance is provided on the concave surface 811 of the reflection member main body 81 similarly to the first reflection member 70.

As illustrated in FIGS. 4 and 5, the first reflection member 70 and the second reflection member 80 are parts divided at equal intervals of about 60 degrees around the illumination axis L and forming a circular-arc shape and a side shape for each when assembled into the sub mirror 60.

The material for constituting the reflection member main bodies 71 and 81 and the cylindrical portions 72 and 82 of the sub mirror 60 (the first reflection member 70 and the second reflection member 80) is quartz glass, for example. The reflection layers 73 and 83 are formed by dielectric multilayer films made of tantalum oxide ($Ta_2O_3$) and silicon oxide ($SiO_2$), for example.

According to this embodiment, the first reflection member 70 (the reflection member main body 71 and the cylindrical portion 72) is molded by blowing tube-shaped quartz glass, and then formed by secondary processing including cutting. The first reflection member 70 may be molded by heating and pressing plate-shaped glass as well as by blow molding. In this case, the shape of the concave surface 711 can be produced with high accuracy. The second reflection member 80 is formed by a method similar to the forming method of the first reflection member 70.

Assembly of the sub mirror 60 as shown in FIG. 4 is completed by connecting the first reflection members and the second reflection members 80 such that the sides of the cylindrical portions 72 and 82 are alternately disposed in contact with one another. In this case, the cylindrical portions 72 and 82 are inserted in such a manner as to be alternately connected with one another using a ring-shaped guide member (not shown) as a reference for guiding the outer circumferences of the cylindrical portions 72 and 82. Then, the sealing portion 50 of the arc tube 20 is inserted through the fixing openings 721 and 821 of the cylindrical portions 72 and 82 of the sub mirror 60 under this condition, and the inorganic adhesive C such as cement is applied to the clearances between the fixing openings 721 and 821 and the sealing portion 50 and hardened thereat. As a result, the sub mirror 60 (cylindrical portions 72 and 82) is fixed to the arc tube (sealing portion 50) (see FIG. 2). Then, the guide member is removed.

The difference between the first reflection member 70 and the second reflection member 80 is that the shapes of the reflection layers 73 and 83 as the reflection surfaces are different (that is, the shapes of the concave surfaces 711 and 811 as the bases forming the reflection layers 73 and 83 are different). More specifically, the curvatures and the like of the concave surfaces 711 and 811 are different. When the first reflection members 70 and the second reflection members 80 are assembled into the sub mirror 60 as illustrated in FIGS. 2 and 5 in this embodiment, a distance A1 between the illumination axis L and each of the reflection layers of the first reflection members 70 is longer than a distance A2 between the illumination axis L and each of the reflection layers 83 of the second reflection members 80. The thicknesses of the first reflection members 70 and the second reflection members 80 are almost equalized for the corresponding parts of the reflection member main bodies 71 and 81, the cylindrical portions 72 and 82, and the reflection layers 73 and 83.

As illustrated in FIGS. 2, 4 and 5, the first reflection member 70 is disposed opposed to the upper area of the tube spherical portion 30, and the second reflection member 80 is disposed opposed to the lower area of the tube spherical portion 30. In this arrangement, the distance A1 between the illumination axis L and the reflection layer 73 of the first reflection member 70 is longer than the distance A2 between the illumination axis L and the reflection layer 83 of the second reflection member 80. Thus, a distance B1 between the upper area of the tube spherical portion 30 and the reflection layer 73 of the first reflection member 70 is longer than a distance B2 between the lower area of the tube spherical portion 30 and the reflection layer 83 of the second reflection member 80. That is, a space from the upper area of the tube spherical portion to the reflection layer 73 of the first reflection member 70 is wider than a space from the lower area of the tube spherical portion 30 to the reflection layer 83 of the second reflection member 80.

As illustrated in FIGS. 4 and 5, a distance D is produced between each adjoining pair of the first reflection member 70 and the second reflection member 80 by setting the distance between the illumination axis L and the outer shape of the first reflection member 70 (the outer shape of the reflection member main body 71) and the distance between the illumination axis L and the outer shape of the second reflection member 80 (the outer shape of the reflection member main body 81) at different lengths.

The projector 1 includes the cooling fan described above (not shown) for cooling the light source device 110. The cooling air generated by the cooling fan is delivered (supplied) in the +Y direction of the sub mirror 60 from the −Y direction (substantially the horizontal direction of the sub mirror 60) as indicated by an arrow E in FIG. 5. More specifically, the cooling air (arrow E) is delivered in a direction substantially perpendicular to the illumination axis L and in the substantially horizontal direction of the sub mirror 60.

The flow of cooling air (arrow E) and the cooling operation for the arc tube 20 (tube spherical portion 30) performed by the cooling air (arrow E) when the cooling air shown by the arrow E is delivered (supplied) to the sub mirror 60 having this structure in the direction substantially perpendicular to the illumination axis L and in the +Y direction of the sub mirror 60 from the −Y direction (substantially horizontal direction of the sub mirror 60) are now explained with reference to FIG. 5.

The cooling air (arrow E) flows into the sub mirror 60 through the clearances D and cools the tube spherical portion 30. More specifically, the cooling air (arrow E) branched as cooling air (arrow E1) flows into the sub mirror 60 through a clearance D1 produced on the side of the first reflection member 70 positioned above the tube spherical portion 30. The cooling air thus introduced (arrow E1) flows in the area having the distance B1 above the tube spherical portion 30 to cool the heat on the upper area of the tube spherical portion 30. Then, the cooling air (arrow E1) flows out through clearances D3, D4 or the like in the +Y direction.

On the other hand, the cooling air (arrow E) branched as cooling air (arrow E2) flows into the sub mirror 60 through a clearance D2 produced on the side of the first reflection member 70 positioned on the −Z, side of the sub mirror 60. The cooling air thus introduced (arrow E2) flows in the area having the distance B2 below the tube spherical portion 30 to cool the heat on the lower area of the tube spherical portion 30. Then, the cooling air (arrow E2) flows out through the clearance D4 or the like in the +Y direction. Some of the branched cooling air (arrow 32) may flow out through a clearance D5 before reaching the area having the distance B2 below the tube spherical portion 30.

As described above, the cooling air (arrow E1) can more easily flow in the area having the distance B1 above the tube spherical portion 30 than the cooling air (arrow E2) flowing in the area having the distance B2 below the tube spherical portion 30 due to the larger length of the distance B1 (distance A1) i.e., the wider space area, than the length of the distance B2 (distance A2). Thus, the temperature of the upper area of the tube spherical portion 30 is easily lowered than the temperature of the lower area. Accordingly, the temperature difference between the upper area and the lower area of the tube spherical portion 30 can be reduced.

Moreover, the cooling air (arrow E) flows on the end side (−X side (reflector 10 side)) of the sub mirror and cools the tube spherical portion 30. More specifically, the cooling air (arrow E) is branched as indicated by an arrow E3, and the branched cooling air (arrow E3) flows on the end side (−X side (reflector 10 side)) of the sub mirror 60. Then, the cooling air (arrow E3) flows in the area having the distance B1 above the tube spherical portion 30 and cools the heat on the upper area of the tube spherical portion 30. On the other hand, the cooling air (arrow E) branched as indicated by an arrow E4 flows on the end side (−X side (reflector 10 side)) of the sub mirror 60, and then flows in the area having the distance B2 below the tube spherical portion 30 to cool the heat on the lower area of the tube spherical portion 30.

In this case, the cooling air (arrow E3) can more easily flow in the area having the distance B1 above the tube spherical portion 30 than the cooling air (arrow E4) flowing in the area having the distance B2 below the tube spherical portion 30 due to the larger length of the distance B1 than the length of the distance B2. Thus, the temperature of the upper area of the tube spherical portion 30 is easily lowered than the temperature of the lower area. Accordingly, the temperature difference between the upper area and the lower area of the tube spherical portion 30 can be reduced.

According to this embodiment, the following advantages can be offered.

(1) According to the light source device 110 in this embodiment, the sub mirror 60 has the first reflection members 70 and the second reflection members 80 having the different reflection surface shapes (shapes of the reflection layers 73 and 83). Also, the distance D is produced between each adjoining pair of the first reflection member 70 and the second reflection member 80 by setting the distance between the illumination axis L and the outer shape of the first reflection member 70 (the outer shape of the reflection member main body 71) and the distance between the illumination axis L and the outer shape of the second reflection member 80 (the outer shape of the reflection member main body 81) at different lengths. Thus, breathability of the sub mirror improves. Moreover, the arc tube 20 (the tube spherical portion 30) can be efficiently cooled by the cooling air (arrow E) introduced through the clearances D for cooling.

(2) According to the light source device 110 in this embodiment, the distance between the illumination axis L and the first reflection member 70 disposed opposed to the upper area of the tube spherical portion (the distance A1 between the illumination axis L and the reflection layer 73) is longer than the distance between the illumination axis L and the second reflection member 80 disposed opposed to the lower area of the tube spherical portion 30 (the distance A2 between the illumination axis L and the reflection layer 83). In this case, the cooling air (arrows E1 and E3) can easily flow into the area above the tube spherical portion 30, and cannot easily flow into the area below the tube spherical portion 30. Thus, the tube spherical portion 30 can be cooled with the reduced temperature difference between the upper area and the lower area of the tube spherical portion 30.

(3) According to the light source device 110 in this embodiment, the tube spherical portion 30 of the arc tube 20 can be cooled with the reduced temperature difference between the upper area and the lower area of the tube spherical portion 30. Thus, the temperature of the lower area of the tube spherical portion 30 does not become excessively low even when the temperature of the upper area of the tube spherical portion 30 is lowered to a predetermined temperature. As a result, decrease the light amount of the arc tube 20 due to the blackening, and corruption of the arc tube 20 by development of the blackening can be prevented. Moreover, since the temperature of the upper area of the tube spherical portion 30 is properly controlled, decrease in the light amount of the arc tube 20 due to the whitening and corruption of the arc tube 20 by development of the whitening and local expansion of the arc tube 20 can be prevented. Accordingly, the life of the light source device 110 can be increased.

(4) The projector 1 according to this embodiment includes the light source device 110 having the sub mirror 60 described above, and the optical modulation device (the liquid crystal devices 400R, 400G, and 400B) for modulating light emitted from the light source device 110 according to image signals to form an optical image. Since the temperature difference between the upper area and the lower area of the tube spherical portion 30 of the arc tube 20 is reduced, the life of the light source device 110 included in the projector 1 can be increased.

(5) The projector 1 in this embodiment includes the cooling fan for cooling the light source device 110. The cooling air (arrow E) generated by the cooling fan is delivered in the direction substantially perpendicular to the illumination axis L and substantially in the horizontal direction of the sub mirror 60. When the cooling air (arrow E) generated by the cooling fan is supplied substantially in the horizontal direction of the sub mirror 60, the cooling air (arrows E1 and E2) can be easily introduced into the sub mirror 60 through the clearances D (D1 and D2) such that the temperature difference between the upper area and the lower area of the tube spherical portion 30 of the arc tube 20 can be reduced more efficiently at the time of cooling the tube spherical portion 30. Accordingly, the life of the light source device 110 included in the projector 1 can be further increased.

(6) According to the light source device 110 in this embodiment, the cooling air (arrows E1 and E2) can be more efficiently introduced through the clearances D (D1 and D2) between the first reflection members 70 and the second reflection members 80, and the space above the tube spherical portion 30 is wider than the space below the tube spherical portion 30 (that is, the distance E1 is longer than the distance B2). In this case, the temperature of the upper area of the tube spherical portion can be efficiently lowered, and the temperature difference between the upper area and the lower area of the tube spherical portion 30 can be further efficiently reduced at the time of cooling the tube spherical portion 30. Accordingly, the number of revolutions of the cooling fan can be set at a lower number than that of a cooling fan in related art, and thus the noise of the projector 1 can be decreased. Moreover, the power consumption of the cooling fan during operation can be reduced.

Second Embodiment

Figure 6:
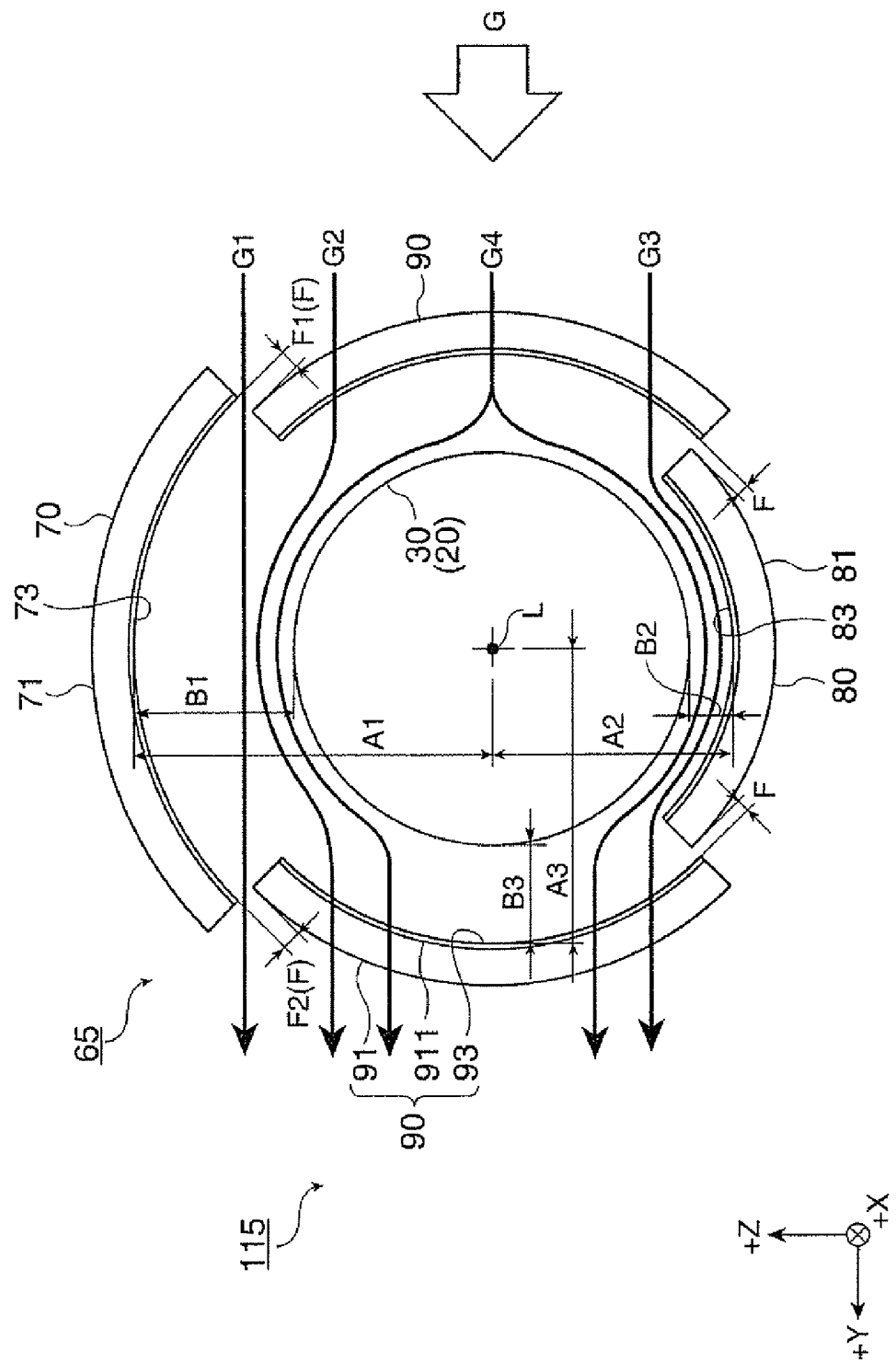
FIG. 6 is a cross-sectional view schematically illustrating a tube spherical portion of a light source device according to a second embodiment and a sub mirror cut at the center of the tube spherical portion along a flat plane perpendicular to an illumination axis.

FIG. 6 is a cross-sectional view schematically illustrating a tube spherical portion of a light source device and a sub mirror cut at the center of the tube spherical portion along a flat plane perpendicular to the illumination axis according to a second embodiment. Similar reference numbers are given to parts similar to those of the first embodiment, and the same detailed explanation is not repeated. An XYZ orthogonal coordinate system shown in FIG. 6 is similar to the XYZ orthogonal coordinate system shown in FIGS. 1 through 5 used in the first embodiment.

The structure and operation of a light source device 115 according to the second embodiment are now described.

The light source device 115 in this embodiment includes the reflector 10 (not shown in FIG. 6) and the arc tube 20 having structures similar to those in the first embodiment. In the second embodiment, however, the structure of reflection members included in a sub mirror is different from that of the sub mirror 60 in the first embodiment.

According to the second embodiment, the sub mirror 65 has the one first reflection member 70 and the one second reflection member 80 similar to those included in the sub mirror 60 in the first embodiment, and further has two third reflection members 90. The first reflection member 70 and the second reflection member 80 in this embodiment have circular-arc shapes expanded longer than those of the first embodiment. More specifically, the first reflection member 70, the second reflection member 80, and the third reflection members 90 in this embodiment are parts divided at equal intervals of about 90 degrees around the illumination axis L and forming a circular-arc shape and a side shape for each when assembled into the sub mirror 65 as illustrated in FIG. 6.

Thus, the structure of the first reflection member 70 and the second reflection member 80 is similar to that in the first embodiment except for the shapes of the first and second reflection members 70 and 80 as described above. Though not specifically shown in the figure, the shapes of the third reflection members 90 are also substantially similar to those of the first and second reflection members 70 and 80. Each of the third reflection members 90 has a reflection member main body having a concave surface 911, a cylindrical portion (not shown) having a fixing opening (not shown), and a reflection layer 93 as a reflection surface formed on the concave surface 911.

The curvature of the concave surface 911 and the like of the third reflection member 90 are different from those of the concave surfaces 711 and 811 of the first reflection member 70 and the second reflection member 80. The material of the reflection member main body 91 and the cylindrical portion and the material of the reflection layer 93 of the third reflection member 90 are similar to the material of the first reflection member 70 and the second reflection member 80.

The sub mirror 65 is assembled in a manner substantially similar to that in the first embodiment. In the second embodiment, the sides of the cylindrical portions of the two third reflection members 90 are initially connected to both the sides of the cylindrical portion 72 of the first reflection member 70 by bringing the third reflection members 90 into contact with the first reflection member 70. Then, the sides of the cylindrical portion 82 of the one second reflection member 80 are fixed to the sides of the cylindrical portions of the two third reflection members 90 by bringing the second reflection member 80 into contact with the third reflection members 90 to complete the sub mirror 65. For fixing the sub mirror 65 to the sealing portion 50 of the arc tube 20, the sealing portion 50 is inserted through the sub mirror 65, and the inorganic adhesive C is applied to the clearance and hardened thereat similarly to the first embodiment.

According to the sub mirror 65, the first reflection member 70 as the reflection member having the maximum distance between the reflection surface of the reflection member and the illumination axis L is disposed opposed to the upper area of the arc tube 20 (the tube spherical portion 30) as illustrated in FIG. 6. Then, the third reflection members 90 as the reflection members having the smaller distances between the reflection surfaces and the illumination axis L are disposed at positions of the arc tube 20 lower than the position of the first reflection member 70, and the second reflection member 80 as the reflection member having the smallest distance between the reflection surface and the illumination axis L is disposed opposed to the lower area of the arc tube 20 (the tube spherical portion 30).

More specifically, the first reflection member is disposed opposed to the upper area of the tube spherical portion 30. The third reflection members 90 are disposed opposed to the sides of the tube spherical portion 30 (between the upper area and the lower area) at positions lower than the position of the first reflection member 70. The second reflection member 80 is disposed opposed to the lower area of the tube spherical portion 30. Assuming the distance between the illumination axis L and the reflection layer 73 of the first reflection member 70 as the distance A1, the distance between the illumination axis L and each of the reflection layers 93 of the third reflection members 90 as a distance A3, and the distance between the illumination axis L and the reflection layer 83 of the second reflection member 80 as the distance A2, the relationship between the lengths of the distances can be expressed as the distance A1>the distance A3>the distance A2.

Thus, assuming the distance between the upper area of the tube spherical portion 30 and the reflection layer 73 of the first reflection member 70 as the distance B1, the distance between the side of the tube spherical portion 30 and each of the reflection layers 93 of the third reflection members 90 as a distance B3, and the distance between the lower area of the tube spherical portion 30 and the reflection layer 83 of the second reflection member 80 as the distance B2, the relationship between the lengths of the distances can be expressed as the distance B1>the distance B3>the distance B2. That is, the space from the upper area of the tube spherical portion 30 to the reflection layer 73 of the first reflection member 70 is the widest, the space from the part between the upper area and the lower area of the tube spherical portion 30 to each of the reflection layers 93 of the third reflection members 90 is the second widest, and the space from the lower area of the tube spherical portion 30 to the reflection layer 83 of the second reflection member 80 is the narrowest.

As illustrated in FIG. 6, clearances F are produced between the adjoining pairs of the first reflection member 70 and the third reflection member 90 and between the third reflection member 90 and the second reflection member 80 by setting the distance between the illumination axis L and the outer shape of the first reflection member 70 (the outer shape of the reflection member main body 71), the distance between the illumination axis L and the outer shape of the second reflection member 80 (the outer shape of the reflection member main body 81), and the distance between the illumination axis L and the outer shape of each of the third reflection members 90 (outer shape of each of the reflection member main bodies 91) at different lengths.

The flow of cooling air (arrow G) and the cooling operation for the arc tube 20 (tube spherical portion 30) by the cooling air (arrow G) when the cooling air shown by the arrow G is delivered (supplied) to the sub mirror 65 having this structure in the direction substantially perpendicular to the illumination axis L and in the +Y direction of the sub mirror 65 from the −Y direction (substantially horizontal direction) are now explained with reference to FIG. 6.

The cooling air (arrow G) flows into the sub mirror 65 through the clearances F and cools the tube spherical portion 30. More specifically, the cooling air (arrow G) branched as cooling air (arrow G1) flows into the sub mirror 65 through a clearance F1 produced on the side of the first reflection member 70 positioned above the tube spherical portion 30. The cooling air thus introduced (arrow G1) flows in the area having the distance B1 above the tube spherical portion 30 to cool the heat on the upper area of the tube spherical portion 30. Then, the cooling air (arrow G1) flows out through a clearance F2 or the like in the +Y direction. The cooling air (arrow G) does not positively cool the lower area of the tube spherical portion 30 by flowing into the sub mirror 65 through the clearances F.

As described above, the cooling air (arrow G1) can more easily flow in the area having the distance B1 above the tube spherical portion 30 than the cooling air flowing in the area having the distance B2 below the tube spherical portion 30 due to the larger length of the distance B1 (distance A1) i.e., the wider space area, than the length of the distance B2 (distance A2). Thus, the temperature of the upper area of the tube spherical portion 30 is easily lowered than the temperature of the lower area. Accordingly, the temperature difference between the upper area and the lower area of the tube spherical portion 30 can be reduced.

moreover, the cooling air (arrow G) flows on the end side (−X side (reflector 10 side)) of the sub mirror and cools the tube spherical portion 30. More specifically, the cooling air (arrow G) is branched as indicated by an arrow G2, and the branched cooling air (arrow G2) flows on the end side (−X side (reflector 10 side)) of the sub mirror 65. Then, the cooling air (arrow G2) flows in the area having the distance B1 above the tube spherical portion 30 and cools the heat on the upper area of the tube spherical portion 30. On the other hand, the cooling air (arrow G) branched as indicated by an arrow G3 flows on the end side (−X side (reflector 10 side)) of the sub mirror 65, and flows in the area having the distance B2 below the tube spherical portion 30 to cool the heat on the lower area of the tube spherical portion 30.

Furthermore, the cooling air (arrow G) branched as indicated by an arrow G4 flows on the end side (−X side (reflector 10 side)) of the sub mirror 65. A part of the cooling air (arrow G4) flows in the area having a distance B3 (the distance between the reflection layer 93 of the third reflection member 90 positioned on the −Y side and the tube spherical portion 30) on the side of the tube spherical portion 30, and flows in the area having the distance B1 above the tube spherical portion 30. The other part of the cooling air (arrow G4) flows in the area having the distance B3 (the distance between the reflection layer 93 of the third reflection member 90 positioned on the −Y side and the tube spherical portion 30) on the side of the tube spherical portion 30, and flows in the area having the distance B2 below the tube spherical portion 30. In this case, the amount of the cooling air (arrow G4) flowing in the area having the distance B1 longer than the distance 83 above the tube spherical portion 30 easily becomes larger than the amount of the cooling air (arrow G4) flowing in the area having the distance B2 shorter than the distance 83 below the tube spherical portion 30.

As can be understood, the cooling air (arrow G2) more easily flows in the area having the distance B1 above the tube spherical portion 30 than the cooling air (arrow G3) flowing in the area having the distance B2 below the tube spherical portion 30 due to the longer length of the distance B1 than the length of the distance B2. Moreover, the cooling air (arrow G4) more easily flows in the area having the distance 81 above the tube spherical portion 30 than the area having the distance B2 below the tube spherical portion 30. Thus, the temperature of the upper area of the tube spherical portion 30 is easily lowered than the temperature of the lower area of the tube spherical portion 30. Accordingly, the temperature difference between the upper area and the lower area of the tube spherical portion 30 can be reduced.

The light source device 115 according to this second embodiment has structure similar to that of the light source device 110 in the first embodiment except for the structure of the sub mirror 65. Thus, the light source device 115 can offer the corresponding advantages of those of the light source device 110 according to the first embodiment, and further provides the following advantage.

(1) According to the sub mirror 65 of the light source device 115 in the second embodiment, the distance between the illumination axis L and the reflection layer of the first reflection member 70 disposed above the arc tube 20 (the tube spherical portion 30) becomes the maximum (the distance A1). The distance A3 located at a position lower than the position of the distance A1 is shorter than the distance A1, and the distance A2 located at a position lower than the position of the distance A3 is shorter than the distance A3 and becomes the minimum distance (the distance A2) below the tube spherical portion 30. In this arrangement, the temperature difference between the upper area and the lower area of the tube spherical portion 30 of the arc tube 20 can be further reduced at the time of cooling the tube spherical portion 30, and the temperature change from the upper area to the lower area of the tube spherical portion 30 can be properly controlled. Thus, problems such as rapid temperature change and local temperature increase of the tube spherical portion 30 particularly on the side of the tube spherical portion 30 can be prevented.

The invention is not limited to the first and second embodiments described herein but may be practiced otherwise without departing from the scope and spirit of the invention. As such, various changes and improvements including the following modifications may be made.

Modified Example 1

According to the first embodiment, the two types of reflection members of the first reflection member 70 and the second reflection member 80 are used as the plural reflection members constituting the sub mirror 60. However, other reflection members having different shapes may be further used. In this case, the distance between the illumination axis L and the reflection layer of the reflection member disposed opposed to the upper area of the tube spherical portion 30 is made longer than the distance between the illumination axis L and the reflection layer of the reflection member disposed opposed to the lower area of the tube spherical portion 30.

Modified Example 2

According to the second embodiment, the plural reflection members constituting the sub mirror 65 are the three types of reflection members of the first reflection member 70, the second reflection member 80, and the third reflection members 90. However, reflection members having different shapes may be further used. In this case, the distance between the illumination axis L and the reflection layer of the reflection member disposed above the tube spherical portion 30 is the maximum distance, and the distance between the illumination axis L and the reflection layer gradually decreases as the position of the reflection member shifts toward the lower area of the tube spherical portion 30. Thus, the distance between the illumination axis L and the reflection layer of the reflection member disposed opposed to the lower area of the tube spherical portion 30 is the minimum distance.

Modified Example 3

The shapes, the numbers and the like of the reflection members (the first reflection member 70 and the second reflection member 80) included in the sub mirror 60 in the first embodiment and the reflection members (first reflection member 70, the second reflection member 80, and the third reflection member 90) included in the sub mirror 65 in the second embodiment are not specifically limited but may be appropriately changed.

Modified Example 4

The projector 1 according to the first and second embodiments is a front type projector. However, the invention is applicable to a rear type projector which includes a projection target surface such as a screen as one unit.

Modified Example 5

The liquid crystal devices 400R, 400G, and 400B as the optical modulation device included in the optical systems of the projector 1 according to the first and second embodiments are transmission type liquid crystal devices. However, reflection type optical modulation devices such as reflection type liquid crystal devices may be used.

Modified Example 6

The optical systems of the projector 1 according to the first and second embodiments include the liquid crystal devices 400R, 400G, and 400B as the optical modulation device. However, the optical modulation device may be other types of device as long as they can generally modulate entering light according to image signals. For example, a micromirror type optical modulation device may be used. In this case, the micromirror type optical modulation device may be a DMD (digital micromirror device), for example.

Modified Example 7

The optical systems of the projector 1 according to the first and second embodiments are of so-called three plate type which uses the three liquid crystal devices 400R, 400G, and 400B in correspondence with the red light, green light, and blue light. However, a single plate type may be employed. Moreover, a liquid crystal device for improving contrast may be added.

The present application claims priority from Japanese Patent Application No. 2009-034909 filed on Feb. 18, 2009, which is hereby incorporated by reference in its entirety.

What is claimed is:

1. A light source device, comprising:
an arc tube that includes a tube spherical portion containing a pair of electrodes disposed along an illumination axis, and a pair of sealing portions extending from both sides of the tube spherical portion;
a reflector disposed in the vicinity of one of the sealing portions of the arc tube to reflect light emitted from the arc tube toward an illumination area; and
a sub mirror configured to reflect the light emitted from the arc tube toward the arc tube, and disposed at a side of another sealing portion in such a manner as to cover a part of the outer surface of the tube spherical portion on a side of the illumination area,
the sub mirror including a plurality of reflection members provided with reflection surfaces having different shapes, and
a distance between the illumination axis and an outer shape of one of adjoining reflection members being different from a distance between the illumination axis and the other of the adjoining reflection members for making a clearance between each other.

2. The light source device according to claim 1, wherein a distance between the illumination axis and the reflection surface of a reflection member included in the plural reflection members disposed opposed to an upper area of the tube spherical portion is longer than a distance between the illumination axis and the reflection surface of a reflection member disposed opposed to a lower area of the tube spherical portion.

3. The light source device according to claim 1, wherein:
the distance between the illumination axis and the reflection surface of the reflection member positioned opposed to the upper area of the tube spherical portion is the maximum;
a distance between the illumination axis and the reflection surface of the reflection member gradually decreases as the position of the reflection member shifts toward the lower area of the tube spherical portion; and
the distance between the illumination axis and the reflection surface of the reflection member disposed opposed to the lower area of the tube spherical portion is the minimum.

4. A projector, comprising:
the light source device according to claim 1; and
an optical modulation device which modulates light emitted from the light source device to form an optical image according to image signals.

5. The projector, comprising:
the light source device according to claim 2; and
an optical modulation device which modulates light emitted from the light source device to form an optical image according to image signals.

6. The projector, comprising:
the light source device according to claim 3; and
an optical modulation device which modulates light emitted from the light source device to form an optical image according to image signals.

7. The projector according to claim 4, further comprising:
a cooling fan which cools the light source device,
wherein cooling air generated by the cooling fan is delivered in a direction substantially perpendicular to the illumination axis and in a direction substantially horizontal to the sub mirror.

8. The projector according to claim 5, further comprising:
a cooling fan which cools the light source device,
wherein cooling air generated by the cooling fan is delivered in a direction substantially perpendicular to the illumination axis and in a direction substantially horizontal to the sub mirror.

9. The projector according to claim 6, further comprising:
a cooling fan which cools the light source device,
wherein cooling air generated by the cooling fan is delivered in a direction substantially perpendicular to the illumination axis and in a direction substantially horizontal to the sub mirror.

10. A light source device, comprising:
an arc tube that includes a tube spherical portion containing a pair of electrodes disposed along an illumination axis, and a pair of sealing portions extending from both sides of the tube spherical portion;
a reflector disposed in the vicinity of one of the sealing portions of the arc tube to reflect light emitted from the arc tube toward an illumination area; and
a sub mirror configured to reflect the light emitted from the arc tube toward the arc tube, and disposed at a side of another sealing portion in such a manner as to cover a part of an outer surface of the tube spherical portion on a side of the illumination area,
the sub mirror having a plurality of reflection surfaces, and a distance between the illumination axis and one of adjoining reflection surfaces being different from a distance between the illumination axis and the other of the adjoining reflection surfaces, and
the sub mirror having a clearance for each pair of the adjoining reflection surfaces.

* * * * *